(12) United States Patent
Ko

(10) Patent No.: US 10,218,395 B2
(45) Date of Patent: Feb. 26, 2019

(54) AMPLIFICATION SYSTEM FOR PUBLIC SAFETY

(71) Applicant: ADRFKOREA, Inc., Incheon-si, Gyeonggi-do (KR)

(72) Inventor: Young hoon Ko, Icheon-si (KR)

( * ) Notice: Subject to any disclaimer, the term of this patent is extended or adjusted under 35 U.S.C. 154(b) by 0 days.

(21) Appl. No.: 15/953,962

(22) Filed: Apr. 16, 2018

(65) Prior Publication Data

US 2018/0316368 A1    Nov. 1, 2018

(30) Foreign Application Priority Data

Apr. 28, 2017  (KR) .................. 10-2017-0054929

(51) Int. Cl.
| | |
|---|---|
| *H04B 1/04* | (2006.01) |
| *H04B 17/10* | (2015.01) |
| *H04B 17/13* | (2015.01) |
| *H04W 4/90* | (2018.01) |
| *H04B 1/40* | (2015.01) |
| *H04W 52/52* | (2009.01) |

(52) U.S. Cl.
CPC .............. *H04B 1/0475* (2013.01); *H04B 1/40* (2013.01); *H04B 17/103* (2015.01); *H04B 17/13* (2015.01); *H04W 4/90* (2018.02); *H04B 2001/0416* (2013.01); *H04W 52/52* (2013.01)

(58) Field of Classification Search
CPC ........ H04B 1/40; H04B 1/0475; H04B 17/13; H04B 17/103; H04B 2001/0416; H04W 4/90; H04W 52/52
See application file for complete search history.

(56) References Cited

U.S. PATENT DOCUMENTS

| | | | |
|---|---|---|---|
| 4,764,979 A * | 8/1988 | Noguchi | ............ H04B 7/15528 379/347 |
| 6,799,027 B1 * | 9/2004 | Forster | .................... H03F 3/608 330/287 |
| 2006/0099923 A1 * | 5/2006 | Wildhagen | ........... H03G 3/3052 455/234.1 |

\* cited by examiner

*Primary Examiner* — Siu M Lee

(74) *Attorney, Agent, or Firm* — Lee & Associates, LLC

(57) ABSTRACT

Provided is an amplification system for a public safety service. The amplification system may be installed to cover a radio-shadow zone, and stably maintain the service despite a distortion in a wireless environment and an excessive input of a spurious interference signal.

10 Claims, 18 Drawing Sheets

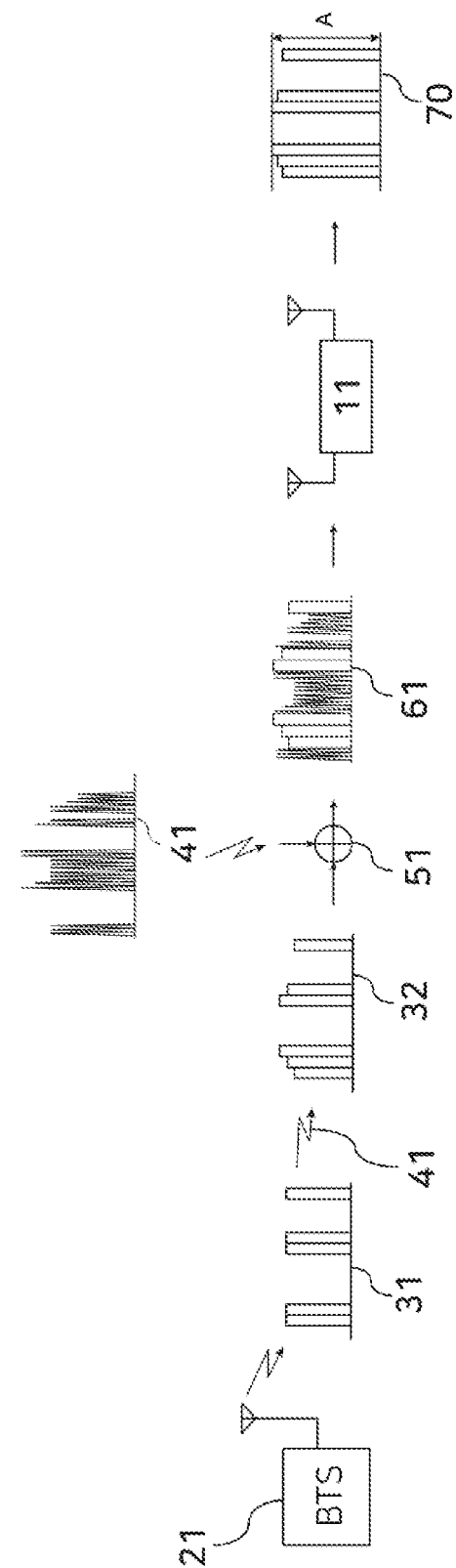

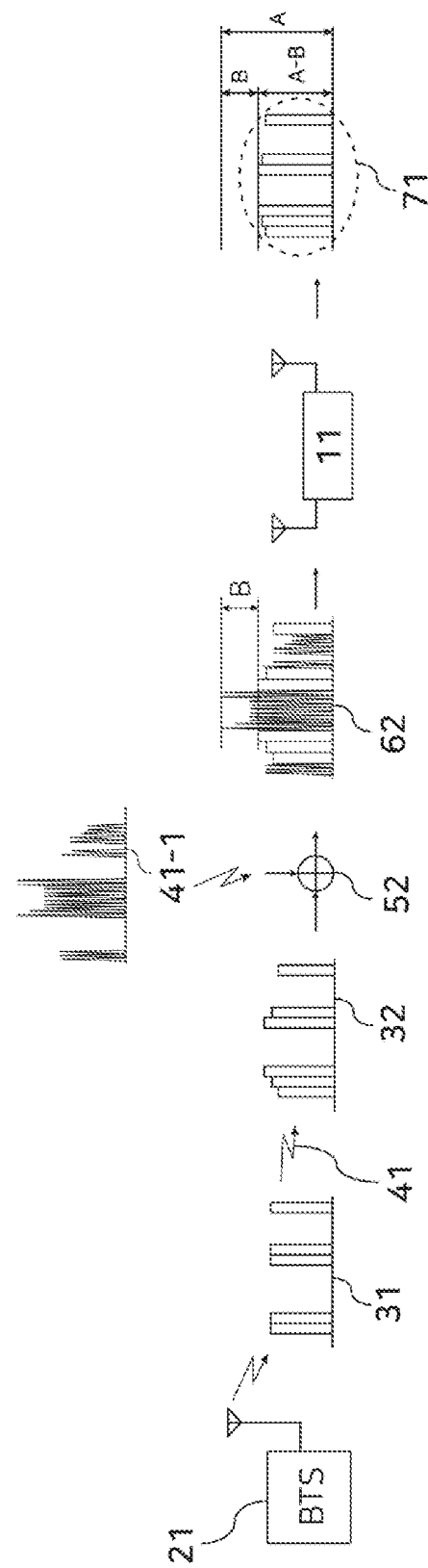

AMPLIFICATION SYSTEM FOR PUBLIC SAFETY

CROSS-REFERENCE TO RELATED APPLICATION(S)

This application claims the priority benefit of Korean Patent Application No. 10-2017-0054929 filed on Apr. 28, 2017, in the Korean Intellectual Property Office, the entire contents of which are incorporated by reference herein.

TECHNICAL FIELD

One or more example embodiments relate to an amplification system for public safety, and more particularly, to technology for stably maintaining a service despite, for example, an excessive input of a spurious signal and other variables in a wave propagation environment and an installation field.

BACKGROUND

An amplification system for public safety may be installed to expand a service coverage radius for a public safety service and provide the service even in a radio-shadow zone. In an existing amplification system, when a spurious signal corresponding to a frequency other than that of a set service channel is excessively input, the amplification system may be damaged, or degraded in terms of gain and service quality. In such case, the amplification system may not perform its functions properly, which may generate another radio-shadow zone.

Thus, an improved amplification system for public safety is presented herein to overcome the issues described above.

SUMMARY

An aspect provides an amplification system for public safety system (including e.g., two-way radio, project 25 led by the Association of Public-Safety Communications Officials International (APCO) (APCO25), terrestrial trunked radio (Tetra), land mobile radio (LMR), and specialized mobile radio (SMR) systems in terms of service system and very high frequency (VHF) or an ultra high frequency (UHF) in terms of service band) that may suppress or remove an unwanted spurious signal itself without affecting a service quality and stably maintain a gain and an output originally set by a user, and may thus stably provide a service without a change in service coverage radius and service quality, in case of an excessive input of a spurious signal at a frequency, other than that of the frequency channel in service of the system According to an aspect, there is provided an amplification system for public safety, the amplification system comprising radio frequency (RF) unit having individually downlink and uplink path, configured to convert an RF of a radio signal to frequency specified by user and output a signal obtained through the converting in appropriate level, a channel unit configured to perform channel processing and spurious elimination, an amplification unit being present in each direction and configured to perform high-power amplification, a frequency separator being present in each direction and configured to separate frequencies by band, a power supply configured to supply power, a controller configured to perform various settings and control operations, and a dry contact interface connected to the controller and configured to provide monitoring information of the controller to an external monitoring interface.

The RF unit may include a front portion configured to receive the radio signal, convert the frequency of the received signal to the specified frequency, adjust a signal to an appropriate level, and transmit to the channel unit, a rear portion configured to receive a signal from the channel unit, convert a frequency of the received signal to a specified frequency, and output a signal adjusted to an appropriate level, and a reference portion configured to generate a reference frequency to be used as a reference frequency of the RF unit and transmit the reference frequency to the channel unit.

The channel unit may include an analog-to-digital converter (ADC) configured to convert an analog signal to a digital signal, a digital-to-analog converter (DAC) configured to convert the digital signal to an analog signal, a channel setter configured to perform channel setting and processing, a level detector configured to detect a level for each set channel and an overall level for all the set channels, a normalizer configured to perform normalization on a level difference among channels, a squelcher configured to perform a squelch operation, and a reference receiver configured to receive the reference frequency from the reference portion of the RF unit.

The amplification unit may include a DAC configured to receive a value set for each frequency and temperature from the controller and output the received value as a voltage, an amplification output detector configured to detect an output level of the amplification unit, and a reflection detector configured to detect a reflection level of an output of the amplification unit.

The controller may control the channel setter to select a desired band from among multiple bands and set one or more channels, monitor level information of the level detector, select an RF processor of a desired band from among respective RF processors of the multiple bands and control a frequency and gain, adjust the high-power amplification unit to be turned on or off and monitor an output level and a reflection level, select a path of each of an RF down-converter and an RF up-converter, process and set frequencies, and perform other controlling operations.

Additional aspects of example embodiments will be set forth in part in the description which follows and, in part, will be apparent from the description, or may be learned by practice of the disclosure.

According to example embodiments described herein, an amplification system for public safety, which will also be referred to hereinafter as a public safety amplification system or simply as an amplification system, may enable a stable provision of a service without deterioration in quality of the service despite an excessive input of a signal at an undesired frequency.

Advantageous effects obtainable from the present disclosure are not limited to the aforementioned effect. Thus, other effects may be clearly understood from the following description by those having ordinary skill in the technical field to which the present disclosure pertains.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIGS. 4a and 4b illustrate an example of a signal flow of frequency spectra of the general public safety amplification system;

FIGS. 5a and 5b illustrate an example of a signal flow of frequency spectra of which an output is reduced by a spurious wave of the general public safety amplification system;

DETAILED DESCRIPTION OF THE DISCLOSURE

Figure 1:
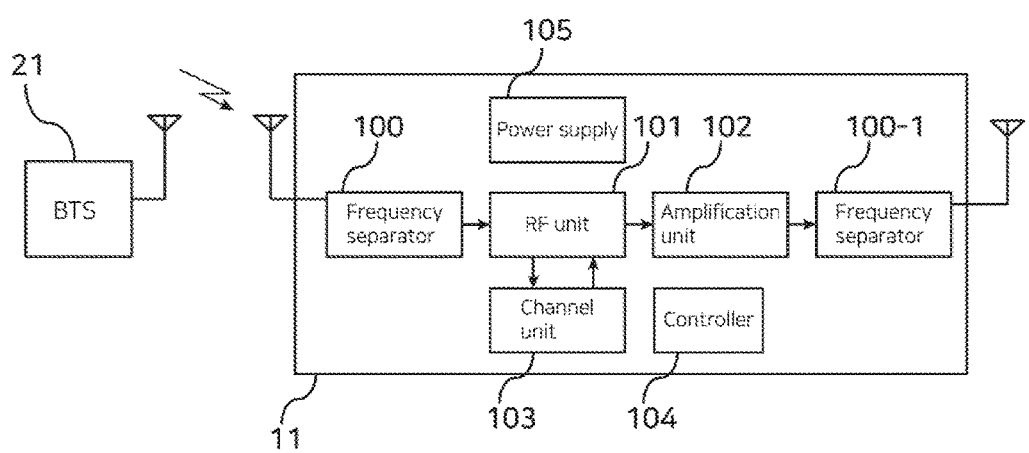
FIG. 1 illustrates an example of a general public safety amplification system according to related arts.
Figure 2:
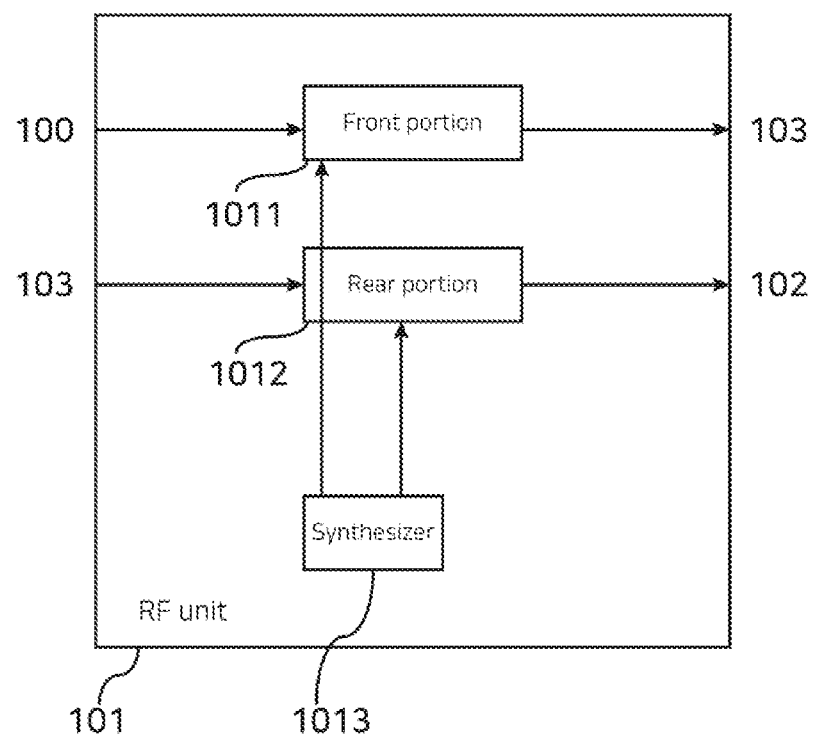
FIG. 2 illustrates an example of a configuration of a radio frequency (RF) unit of the general public safety amplification system.

Hereinafter, some example embodiments will be described in detail with reference to the accompanying drawings. Regarding the reference numerals assigned to the elements in the drawings, it should be noted that the same elements will be specified by the same reference numerals, wherever possible, even though they are shown in different drawings. Also, in the description of example embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. The configuration and effects thereof can be clearly understood from the following description.

Figure 3:
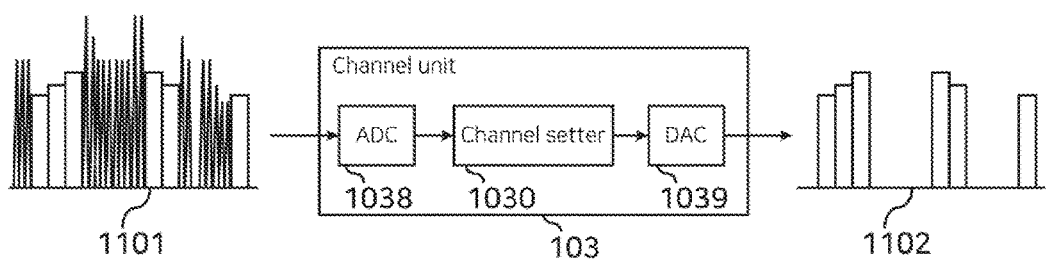
FIG. 3 illustrates an example of a configuration of a channel unit of the general public safety amplification system.

FIG. 1 illustrates an example of a configuration of an existing general amplification system for public safety, which will also be referred to hereinafter as a general public safety amplification system 11 or simply as an amplification system 11 or a system 11. In the general public safety amplification system 11, a frequency of a signal input from a base transceiver station (BTS) 21 through an antenna may be separated by a frequency separator 100 and converted to a specified frequency by a front portion 1011 of a radio frequency (RF) unit 101, and a gain thereof may also be adjusted through the front portion 1011. An obtained signal may then be converted to a digital signal through an analog-to-digital converter (ADC) 1038 of a channel unit 103, and then channel-filtered through a channel setter 1030, as illustrated in FIG. 3. An obtained signal may then be converted to an analog signal through a digital-to-analog converter (DAC) 1039, and then input to a rear portion 1012 where a frequency of the input signal may be converted to a specified frequency and a gain thereof may be adjusted to an appropriate gain. An amplification unit 102 may amplify the signal to an appropriate gain and transmit the amplified signal to a frequency separator 100-1, and thus a service signal may then be emitted through an antenna.

FIG. 4a illustrates an example of a signal flow of the general public safety amplification system 11. Referring to FIG. 4a, a service signal 31 emitted from the BTS 21 may be affected by an influence of an external environment, such as, for example, a fading of a wireless path and a doppler effect, to become a signal 32 of which a level for each frequency channel is distorted. A service signal 61 in which an external spurious signal 41 is mixed on the wireless path may be input to the general public safety amplification system 11 and a spurious wave may then be removed therefrom, and thus an amplified service signal 70 may be output.

Figure 4B:
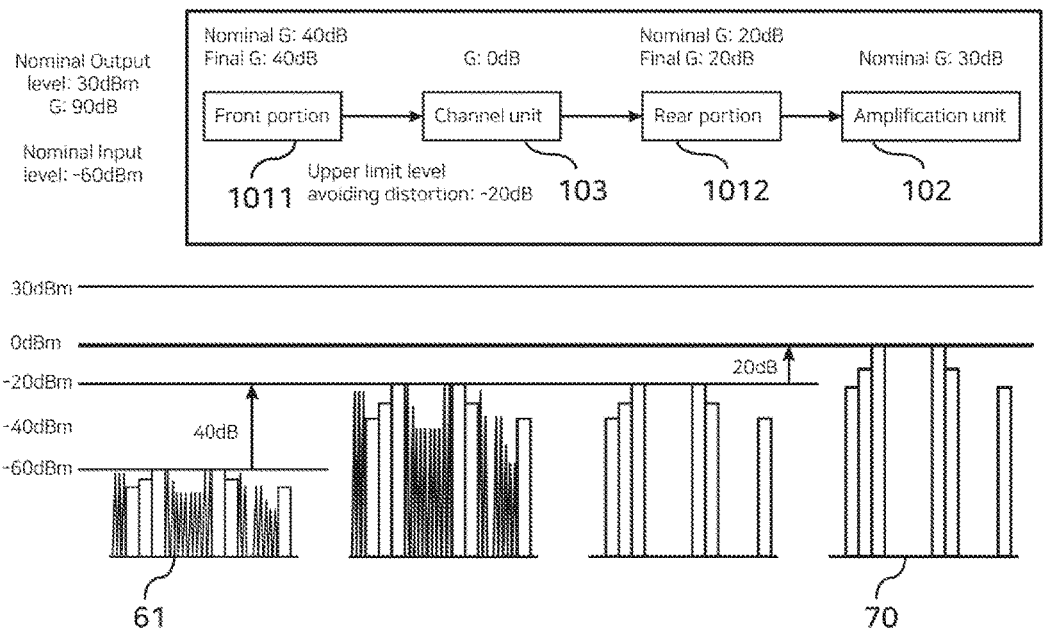

Referring to FIG. 4b, as a detailed numerical example, when an input signal 61 with −60 decibel-milliwatts (dBm) is input to the front portion 1011 of the system 11 of which a gain of the system 11 is 90 decibels (dB), a gain of the front portion 1011 of the RF unit 101 is 40 dB, a gain of the channel unit 103 is 0 dB, an input level limit of the channel unit 103 is −20 dBm, a gain of the rear portion 1012 is 20 dB, and a gain of the amplification unit 102 is 30 dB, a signal that is amplified to −20 dBm by 40 dB of the gain of the front portion 1011 may be input to the channel unit 103. Due to 0 dB of the gain of the channel unit 10, the same level signal from which a spurious component 41 is removed may be output. An output signal 70 with a level of 30 dBm may be output based on 20 dB of the gain of the rear portion 1012 and 30 dB of the gain of the amplification unit 102.

However, referring to FIG. 5a, when a spurious signal 41-1 is greater than a rated level, or a nominal level, of an input service signal by B as shown in 62, the controller 104 may monitor output level information of a pre-output detector 1007 and determine that a level is higher by B, and thus attenuate a gain of an input protection variable amplifier 1001 by B such that an obtained signal with the attenuated gain is output from the front portion 1011, and then a spurious wave may be removed therefrom through the channel unit 103. Thus, an output signal 71 may then be output through the rear portion 1012 and the amplification unit 102 at an output level, for example, A−B, that is reduced by B from a nominal output level A.

Figure 5B:
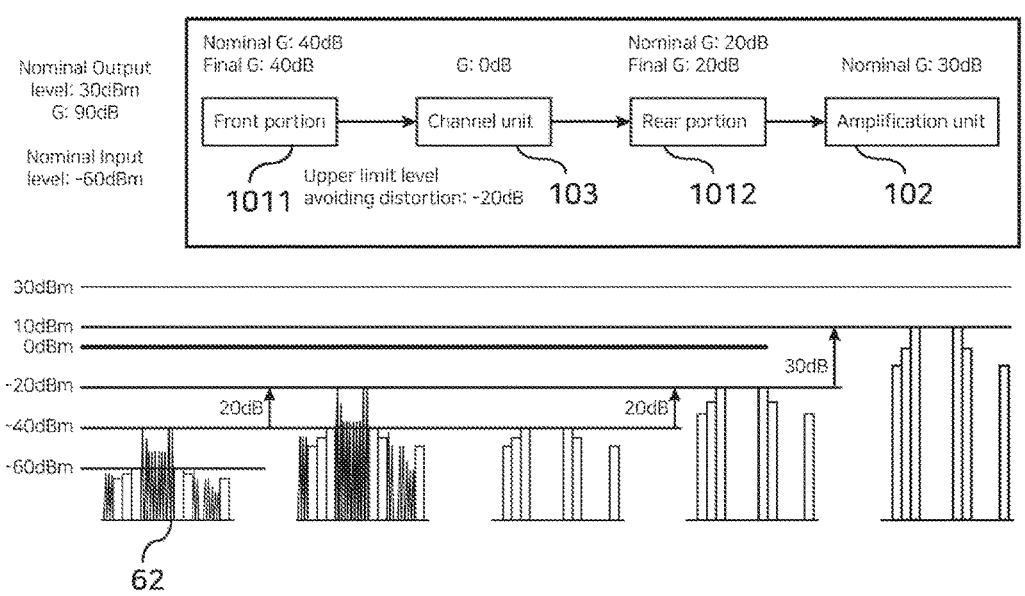
Figure 6:
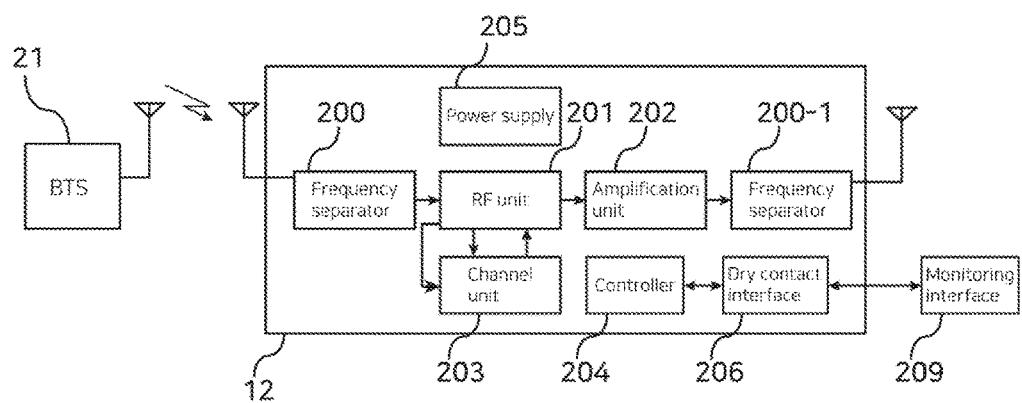
FIG. 6 illustrates an example of a public safety amplification system according to an example embodiment.
Figure 8A:
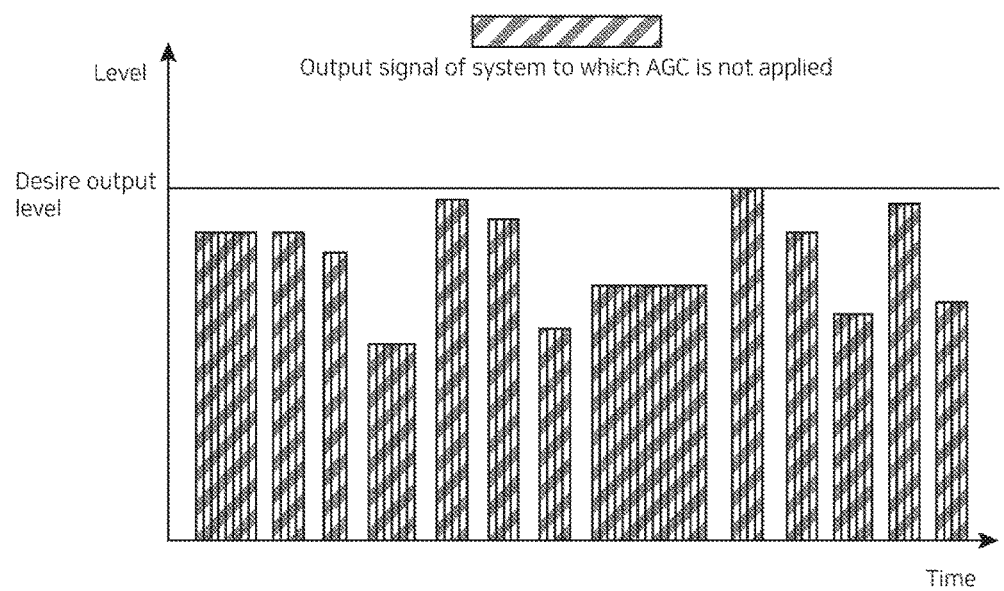
FIG. 8a illustrates an example of an output level characteristic of the amplification unit of the general public safety amplification system not including an automatic gain controller (AGC) on a time axis.
Figure 8B:
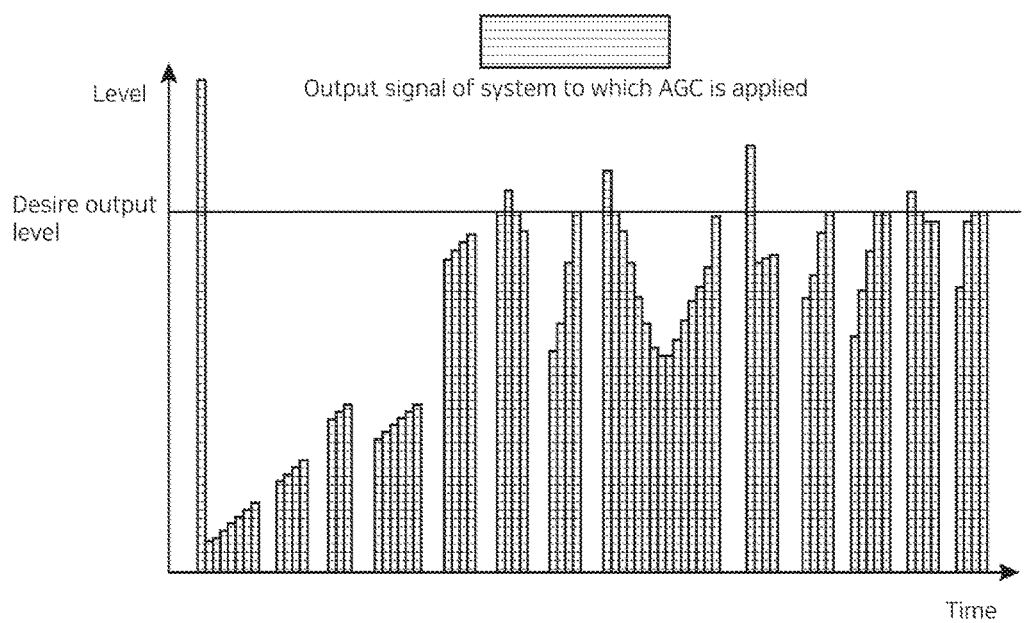
FIG. 8b illustrates an example of an output level characteristic of the amplification unit of the general public safety amplification system including an automatic gain controller (AGC) on a time axis.

Referring to FIG. 5b, as a detailed example of a signal flow, when an input signal 62 in which −60 dBm of a level of a service signal and −40 dBm of a level of a spurious wave are mixed under the same condition described above is amplified by 40 dB of the gain of the front portion 1011, the amplified signal may exceed a reference, for example, −20 dBm of the input level limit of the channel unit 103, that is, −40 dBm of the level of the spurious wave is amplified by 40 dB in the channel unit 103 and 0 dBm is thus input, and thus the gain of the front portion 1011 may be adjusted to be 20 dB of a final gain of the front portion 1011 under the control of the controller 104. After the spurious wave is removed through the channel unit 103, a system output signal 70 at a level of 10 dBm may be output based on 20 dB of the gain of the rear portion 1012 and 30 dB of the gain of the amplification unit 102. Thus, when a spurious wave higher than a service signal is input, the amplification system 11 may output a signal at an output level reduced by a difference therebetween, and thus a service coverage radius may also be reduced and a service quality may be degraded accordingly. To prevent such an issue of reduction in service coverage radius, an automatic gain controller (AGC) 1028 of the amplification unit 102 of the amplification system 11 may control a gain of a variable gain amplifier 1021 based on output level information of an output level detector 1029 of the amplification unit 102, and maintain a constant output level to prevent an overall system gain from decreasing. However, in a case of the output level detector 1029, when using an envelope detection method or other detection methods, for example, service signaling methods such as time-division multiple access (TDMA), time division duplex (TDD), evolution-data only (EVDO), and long-term evolution (LTE) methods, a signal may be repeated on or off, or shaken, in a time domain based on a period of a few microseconds (µs). In a case of such a signal, an automatic gain control function of the amplification unit 102 may require time to control a gain after detecting an output level. Thus, in a case in which an accurate output is not readily and immediately detected, controlling a gain based on inaccurate output level information may result in a greater distortion of an output level in addition to a failure in maintaining a constant output. As illustrated in FIGS. 8a and 8b, in a case in which a service signal is repeated on or off based on a short period of time in a time domain, a difference between an actual output signal level and a detected output level may occur. Herein, when automatically controlling a gain to compensate for such a difference, a difference between a time at which a level is detected and a time at which a gain is controlled may also occur, and thus a distorted output level that is far from a desired output level may be output to the system. In addition, in a period in which a signal is not present, level information of the output level detector 1029 may indicate a relatively low value, and the AGC 1028 may increase a gain by a difference between a desired output level and a level indicated by the output level detector 1029. Herein, when an input is applied suddenly, an abnormal excessive output signal may be output from the system. When the output level detector 1029 indicates an excessive output level, a gain may be controlled again, and an instable system output may thus be emitted on a time axis as illustrated in FIG. 8b. Thus, a service quality may be degraded, and also parts or components may be damaged due to such an excessive output signal.

FIGS. 6 and 9, and 10 and 12 are diagrams illustrating a configuration of a public safety amplification system 12 according to an example embodiment. Referring to the illustrated configuration, a signal input from a BTS 21 through an antenna may be separated by frequency through a frequency separator 200, and a frequency of the signal may be converted to a specified frequency and a gain thereof may be adjusted by a front portion 2011 of an RF unit 201. An obtained signal may then be converted to a digital signal through an ADC 2038 of a channel unit 203, and processed through a squelcher 2037 of the channel unit 203 based on presence or absence of a signal. The processed signal may be filtered by channel through a channel setter 2031 of the channel unit 203, normalized by level through a normalizer 2032 of the channel unit 203, and then converted to an analog signal through a DAC 2039 of the channel unit 203 to be input to a rear portion 2012. A frequency of the input signal may be converted to a specified frequency, and the signal may be adjusted to an appropriate gain and then transmitted to an amplification unit 202 to be amplified therein. The amplified signal may be transmitted to a frequency separator 200-1, and a service signal may then be emitted through an antenna. In addition, a dry contact interface 206 may be connected to a controller 204, and transmit a monitoring state managed by the controller 204 to an external monitoring interface 209. The dry contact interface 206 may include a relay contact, and thus stably transmit state information of the system 12 irrespective of an electrical state of the external monitoring interface 209.

Figure 10:
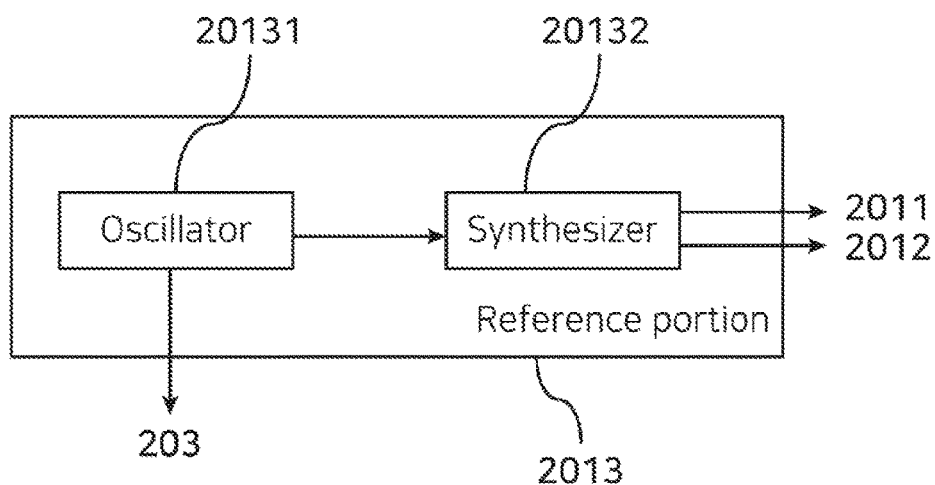
FIG. 10 illustrates an example of a configuration of a reference portion of the public safety amplification system according to an example embodiment.

In addition, as illustrated in FIG. 10, a reference portion 2013 includes an oscillator 20131 and a synthesizer 20132. The synthesizer 20132 may perform frequency synthesis based on a reference frequency of the oscillator 20131 to have a specified frequency under the control of the controller 204. An obtained signal with the synthesized frequency may be output to mixers 2002 and 2002-1, and the signal with the reference frequency of the oscillator 20131 may be transmitted to a reference receiver 2033 of the channel unit 203 such that the channel unit 203 and the RF unit 201 may share a single reference frequency, and thus frequency stability and phase noise characteristics may be improved. The frequency stability, in particular, may be important because a channel width used in a public safety system may be allocated up to a few kilohertz (kHz) at the least. The synthesizer 20132 may transmit, to the controller 204, information as to whether the synthesizer 20132 is operating normally.

Figure 12:
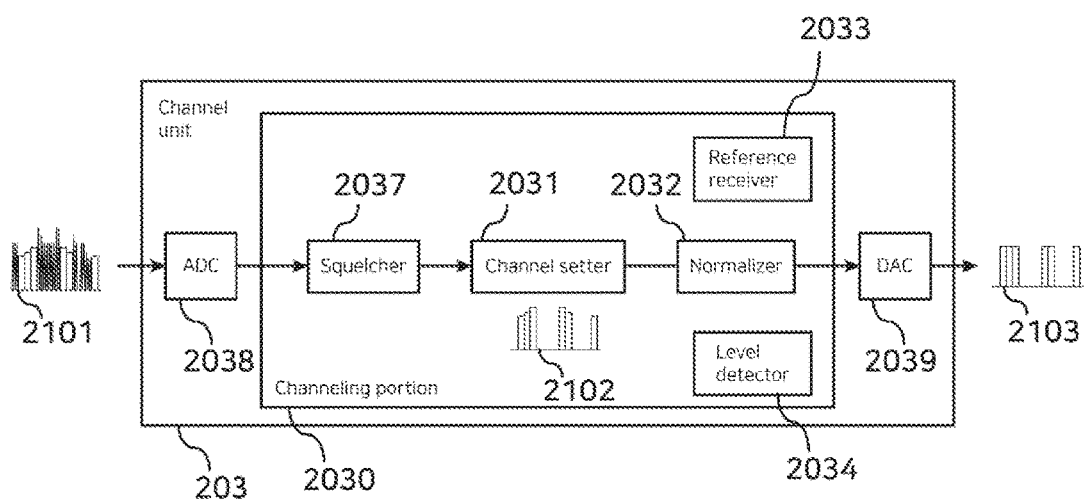
FIG. 12 illustrates an example of a configuration of a channel unit of the public safety amplification system and a change in frequency spectra according to an example embodiment.
Figure 13:
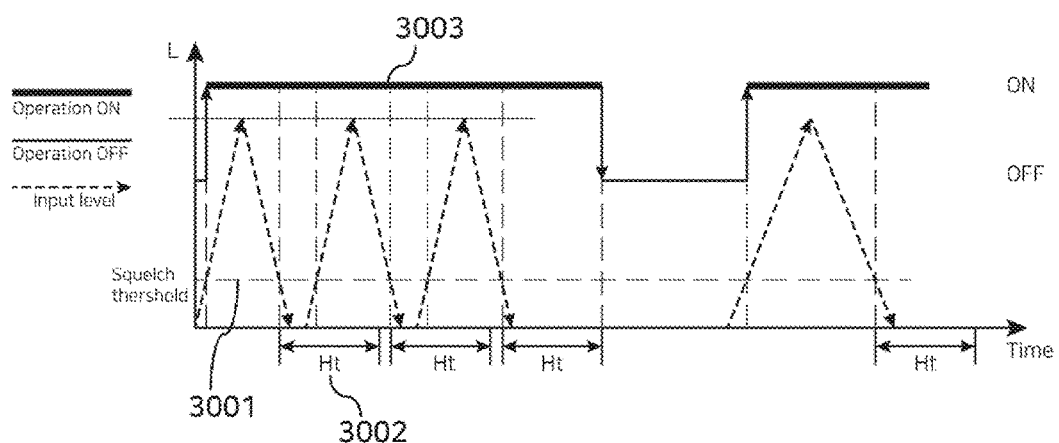
FIG. 13 illustrates an example of a squelch operation of the public safety amplification system according to an example embodiment.

As illustrated in FIG. 12, the channel setter 2031 of the channel unit 203 may pass a necessary signal through a channel set based on a channel bandwidth, a number of channels, and a channel frequency setting that are set by the controller 204, and remove a spurious wave other than the channel. The normalizer 2032 may normalize a level for each channel based on a specified normalization standard such that a uniform level for each channel may be output. As illustrated in FIG. 13, the squelcher 2037 may compare a level input to the ADC 2038 and a specified squelch threshold 3001. Herein, in response to the input level being greater than the squelch threshold 3001, an operation may be immediately turned on as illustrated by 3003. The operation may not be immediately turned off even though the input level is lowered to be less than the squelch threshold 3001 while the operation of the channel unit 203 is being in an on state as shown in 3003. However, when the input level becomes less than or equal to the squelch threshold 3001 after a hysteresis time (Ht) 3002 elapses, a hysteresis function that performs such an off operation may be included. Thus, it is possible to prevent a frequent repetition of such on or off operations around the squelch threshold 3001 by a squelch function. Through such a squelch function, the operation may be turned off in the absence of a call signal, and thus it is possible to reduce a rise of noise in a base station or other systems.

A channel level detector 2034 may detect an input level for each channel, and a level for each channel and an overall output level after channel filtering is performed, and transmit the detected levels to the normalizer 2032 such that the normalizer 2032 performs channel normalization. In the channel unit 103 of the general public safety amplification system 11, an output signal 31 of the BTS 21 may be distorted in level for each channel while passing through a wireless path 41, and then become a mixed signal 62 in which a spurious wave 41-1 is mixed on a wireless path 51. The mixed signal 62 may be input to the system 12. Herein, when such a mixed signal 62 is output in a form of a signal 2102 from which the spurious wave 41-1, other than a set channel, is removed through the channel setter 2031 of the channel unit 203 as illustrated in FIG. 12, it may be output in a form of a signal 1102 distorted in level as illustrated in FIG. 3, rather than a uniform signal 31 for channels transmitted from the BTS 21, and a service quality may be degraded. To prevent such degradation, the normalizer 2032 of the improved channel unit 203 may normalize a distorted level for each channel such that a uniform signal 2103 for the channels may be output as illustrated in FIG. 12.

Figure 9:
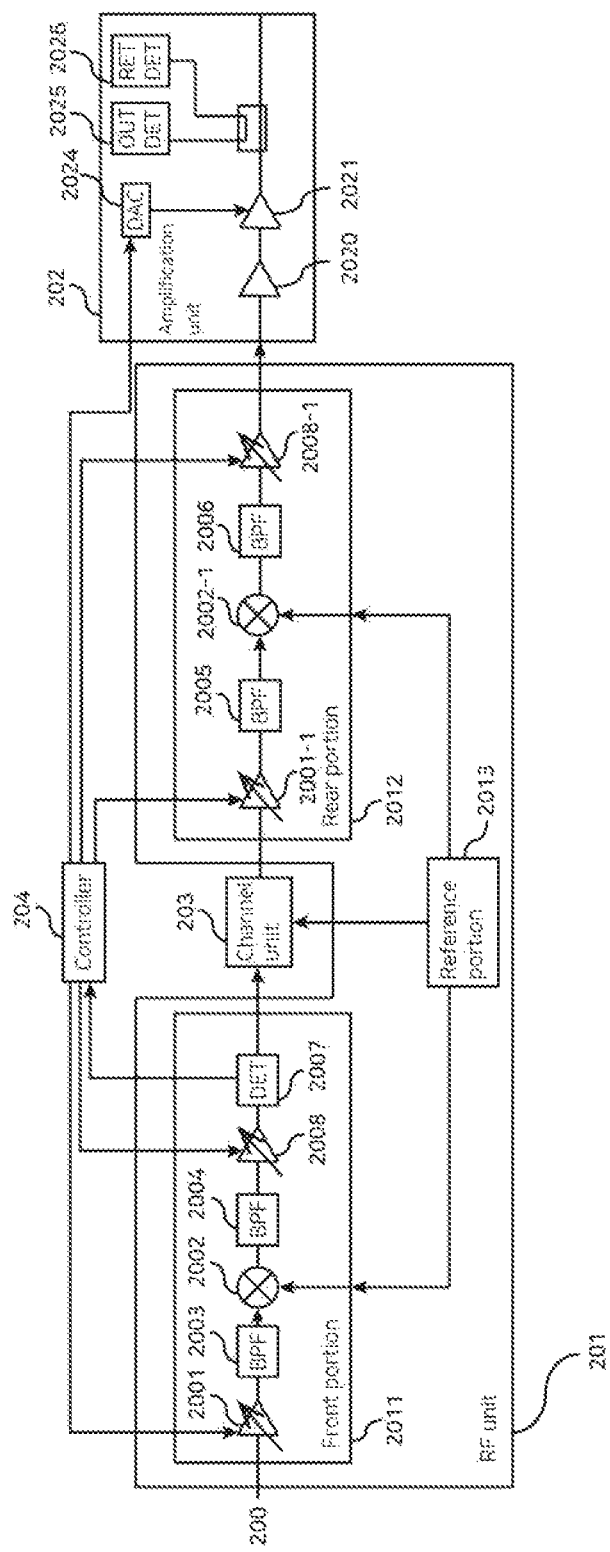
FIG. 9 illustrates an example of a detailed configuration of the public safety amplification system according to an example embodiment.

Referring to FIG. 9, the front portion 2011 of the improved RF unit 201 may adjust a signal input from a base station in appropriate gain through pre-variable gain amplifiers 2001 and 2002 and output the adjusted signal, and then convert a frequency of the signal through a pre-frequency mixer 2002 and the reference potion 2013 and transmit a signal obtained through the converting to the channel unit 203. A pre-output detector 2007 may detect an output level of the front portion 2011, and transmit information obtained through the detecting to the controller 204. Herein, in response to the detected output level exceeding an input level limit of the channel unit 203, the controller 204 may calculate an excess amount based on the information of the pre-output detector 2007 and control a gain of the pre-variable gain amplifiers 2001 and 2002 such that an excessive input is not input to the channel unit 203. In response to a normal level being detected, the controller 204 may restore an original gain. In addition, the controller 204 may increase a gain of post-variable gain amplifiers 2001-1 and 2002-1 by an amount of a gain reduced in the pre-variable gain amplifiers 2001 and 2002 such that an overall system gain stays constant. A post-frequency mixer 2002-1 and the reference portion 2013 may convert a frequency to a frequency originally input to the system 12.

Figure 11A:
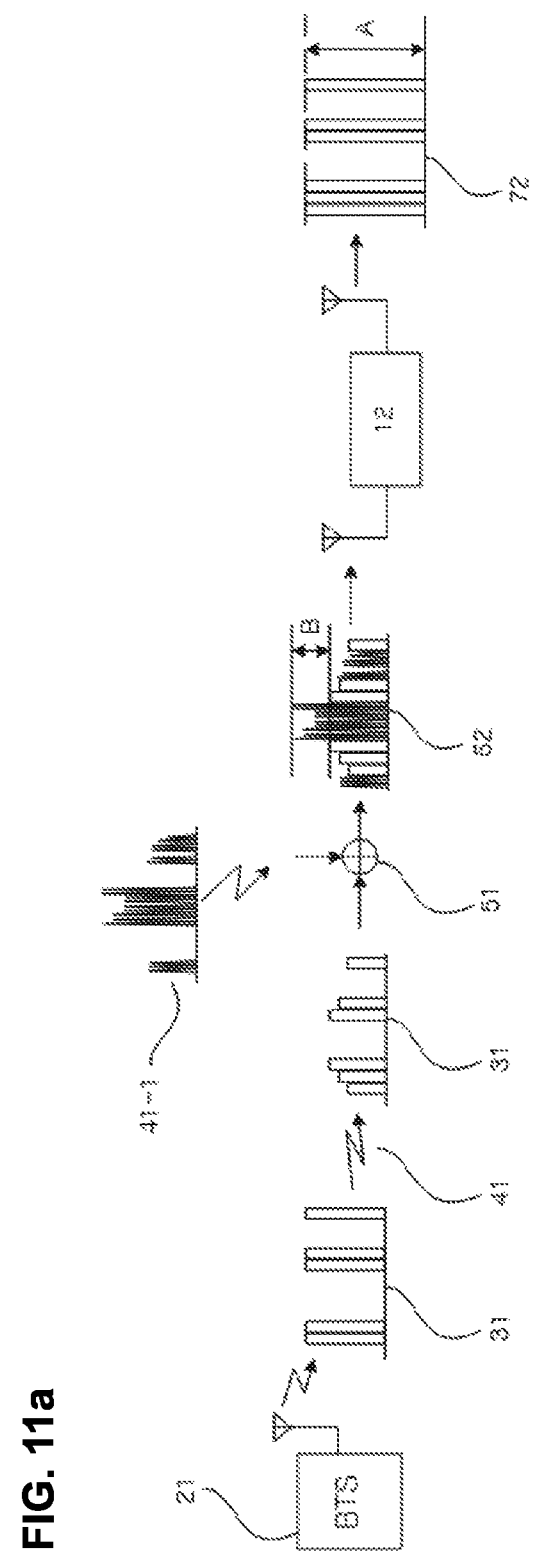
FIGS. 11a and 11b illustrate an example of a signal flow of frequency spectra of the public safety amplification system according to an example embodiment.
Figure 11B:
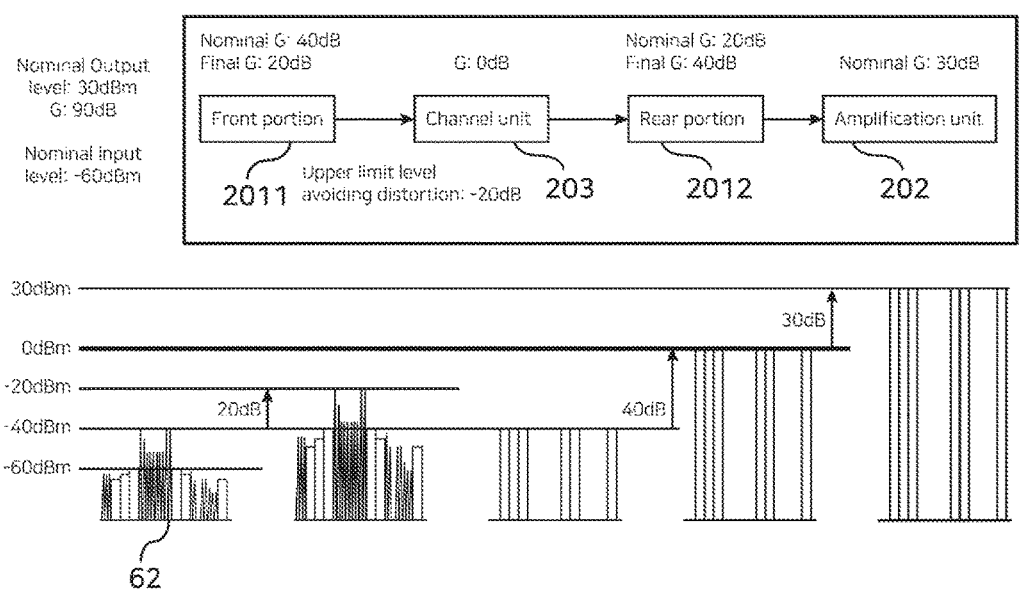

FIGS. 11a and 11b illustrate a signal flow under a condition in which a system gain is 90 dB, a nominal system output is 30 dBm, a front portion gain is 40 dB, a channel unit gain is 0 dB, a rear portion gain is 20 dB, an amplification unit gain is 30 dB, and a channel unit input level limit is −20 dBm. Referring to FIGS. 11a and 11b, when a signal 62 of which a level of a spurious wave is 20 dB higher than −60 dBm of a level of a service signal is input to the front portion 2011, 40 dB of the original gain of the front portion 2011 may be adjusted to 20 dB in order not to exceed −20 dBm of the input level limit of the channel unit 203, and a signal 63 with the adjusted gain may be output and then input to the channel unit 203 to pass through channel filtering and normalization in the channel unit 203. In the rear portion 2012, a signal 64 output through the channel filtering and the normalization may increase in gain by 20 dB, which corresponds to the gain reduced in the front portion 2011, and thus 20 dB of the original gain of the rear portion 2012 may increase to 40 dB, and a signal 65 output through such increasing may be amplified through the amplification unit 202 and to be output as a signal 72 with a level of 30 dBm. Herein, the controller 204 may adjust the gain of the rear portion 2012, concurrently with the gain of the front portion 2011 when adjusting the gain of the front portion 2011, based on the input level limit of the channel unit 203 such that a service is stably provided without a change in overall system gain and a change in output in a time domain.

Figure 7:
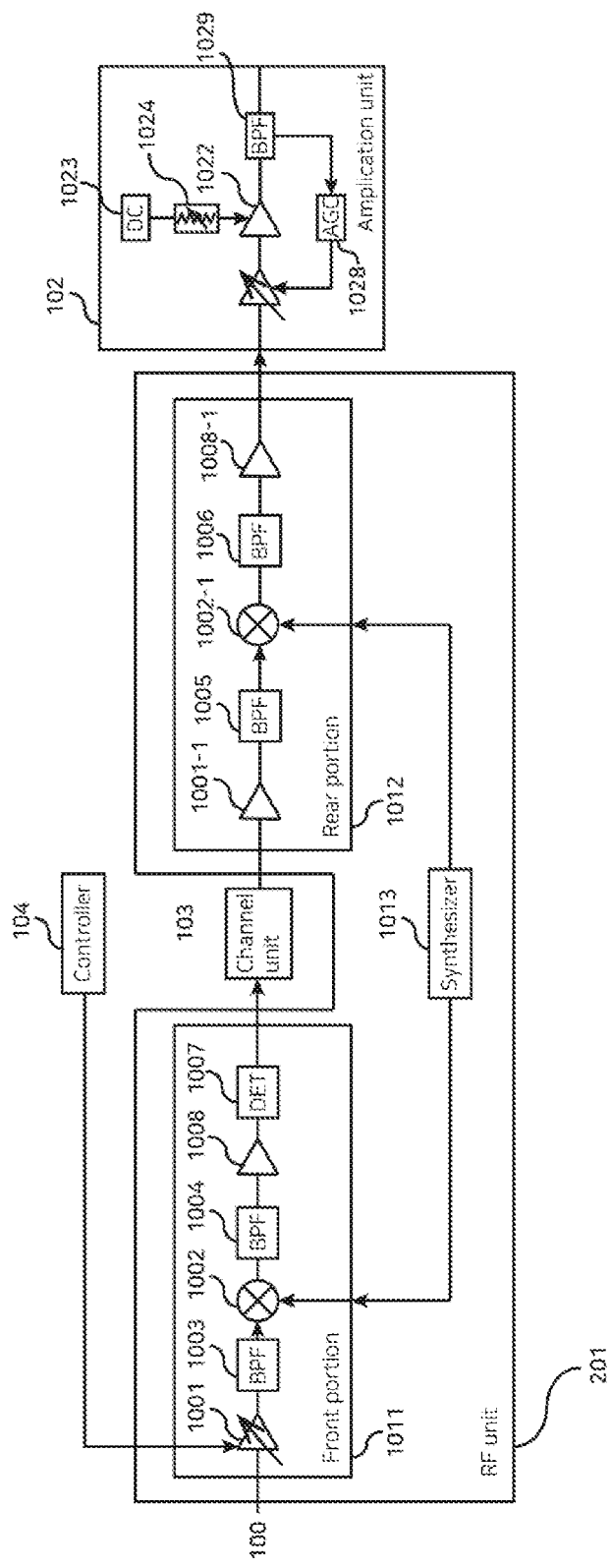
FIG. 7 illustrates an example of a detailed configuration of the general public safety amplification.

In related arts, the amplification unit 102 illustrated in FIG. 7 may rotate a variable resistor 1022 by optimizing an operating point of an amplification transistor (TR) 1022 by manually driving a screwdriver such that the operating point is maintained by a finally fixed resistance value. However, in a case of a very high frequency (VHF) or ultra high frequency (UHF) band, which includes a frequency of a general public safety network, an entire band may reach several hundreds of megahertz (MHz), and thus the single fixed operating point may not be sufficient to satisfy both intermodulation and spurious characteristics for a wide band and a temperature change. When a service frequency plan is changed after a system is installed in a field or a situation before the installation occurs, and thus a service needs to be provided at a changed frequency, the amplification unit 102 may not be readily optimized in the field, and thus a new amplification system or a new amplification unit may need to be purchased additionally to replace the amplification unit 102. In addition, in a case in which the amplification TR 1022 is provided as a plurality of amplification TRs, an operating point of each of the amplification TRs may need to be optimized manually and directly by a human hand, which may make it more difficult to stably maintain a service suitable for a change in frequency and temperature.

However, the improved amplification unit 202 illustrated in FIG. 9 may use an amplification DAC 2024 including a plurality of analog output pins to control an operating point of each of the amplification TRs to be suitable for a frequency and a temperature under the control of the controller 204, and may thus facilitate installation and response, and stable maintenance of a service, despite a change in situation or environment in the field without degradation of intermodulation and spurious characteristics.

The controller 204 may include a temperature detector therein, and adjust a gain of the front portion 2011 and a gain of the rear portion 2012 using information of the pre-output detector 2007 of the front portion 2011. The controller 204 may also control the reference portion 2013 for frequency synthesis and the channel setter 2031 of the channel unit 203 to set a number of channels, a frequency for each channel, and a channel width. The controller 204 may also perform controlling operations for normalization based on information transmitted from the channel level detector 2034, and control the amplification unit 202 to be turned on or off and monitor level information of an output detector 2025 and a reflection detector 2026. The controller 204 may also perform controlling operations such that a voltage specified by each frequency and temperature is output based on frequency information set by the channel setter 2031 when controlling the amplification DAC 2024 and on temperature information of a temperature detector embedded in the amplification unit 202.

A power supply 205 may supply power to each end of the system 12 and transmit, to the controller 204, information as to whether power is being normally supplied.

Figure 14:
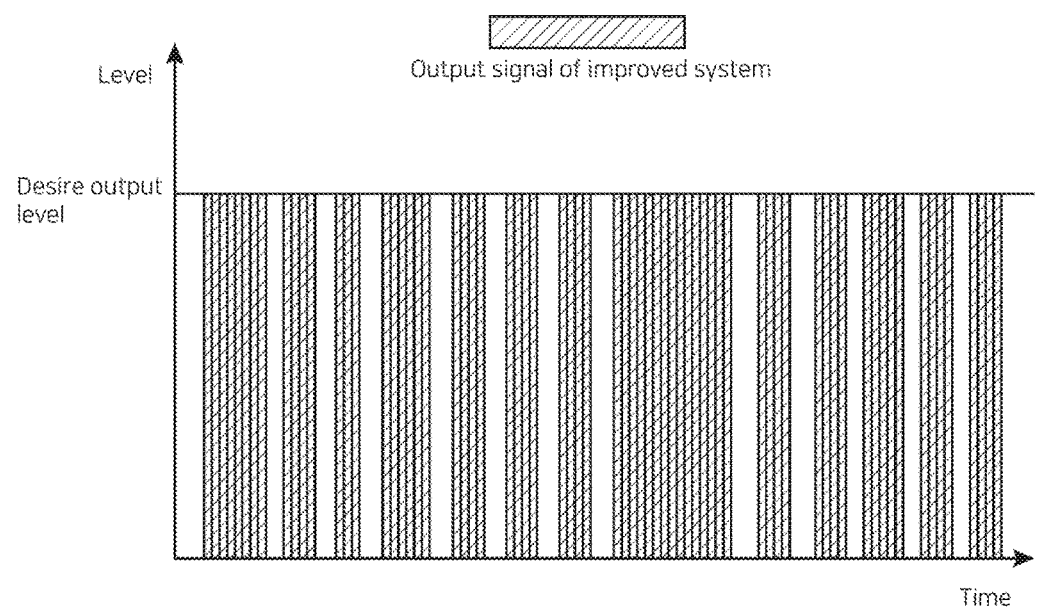
FIG. 14 illustrates an example of an output level characteristic on a time axis of the public safety amplification system according to an example embodiment.

FIG. 14 illustrates an example of an output level characteristic on a time axis of the public safety amplification system 12 according to an example embodiment. As shown in FIG. 14, a stable output may be enabled even in a same environmental condition as shown in FIGS. 8*a* and 8*b*, and a stable provision of a service may thus be enabled.

Although the amplification system for public safety, or the public safety amplification system, has been described in detail above through a few example embodiments, the present disclosure is not limited thereto and should be construed as having the widest range according to the basic spirit disclosed herein. Those skilled in the art may implement a pattern of a form not stated above by combing or replacing the disclosed example embodiments, which should also be construed as within the scope of the present disclosure. Further, it will be apparent to those skilled in the art that various modifications and variation can be easily made to these example embodiments without departing from the spirit or scope of the claims.

What is claimed is:

1. An amplification system for public safety, comprising:
   a radio frequency (RF) unit configured to perform, on a radio signal, gain level adjustment, frequency synthesis, and frequency conversion;
   a channel unit configured to perform channel processing and spurious removal;
   an amplification unit configured to perform high-power amplification;
   a frequency separator configured to separate frequencies by band;
   a controller configured to control and monitor an operation state of the amplification system;
   a power supply configured to supply power; and
   a dry contact interface connected to the controller and configured to provide state information.

2. The amplification system of claim 1, wherein the RF unit comprises:
   a front portion configured to output at a specified level a signal input from an antenna and convert a frequency thereof to a specified frequency;
   a rear portion configured to output at a specified level a signal input from the channel unit and convert a frequency thereof to a specified frequency; and
   a reference portion configured to enable the frequency synthesis, and the frequency conversion by transmitting a synthesized frequency to the front portion and the rear portion.

3. The amplification system of claim 2, wherein the front portion comprises:
   a pre-output detector configured to detect an output level of the front portion and transmit the detected output level to the controller; and
   a pre-variable gain amplifier configured to control a gain to be a gain set by the controller.

4. The amplification system of claim 3, wherein the rear portion comprises:
   a post-variable gain amplifier configured to control a gain to be a gain set by the controller.

5. The amplification system of claim 2, wherein the reference portion comprises:
   an oscillator configured to generate a reference frequency; and
   a synthesizer configured to synthesize a frequency into a frequency set based on the reference frequency input from the oscillator and on frequency synthesis information set by the controller, and transmit the synthesized frequency to the front portion and the rear portion.

6. The amplification system of claim 1, wherein the channel unit comprises:
   an analog-to-digital converter (ADC) configured to convert, to a digital signal, a signal input from a front portion of the RF unit;
   a channel setter configured to perform a channel filtering function based on a channel bandwidth, a number of channels, and a frequency setting for each channel that are set by the controller;
   a normalizer configured to process a level for each channel to output a uniform level based on a normalization reference setting set by the controller and channel level detection information transmitted from a channel level detector;
   a squelcher configured to turn on or off an operation of the channel unit by comparing a level input to the ADC to a specified squelch threshold and applying a hysteresis time;
   the channel level detector configured to detect an input level for each channel, and an output level for each channel and an overall level obtained after the channel filtering function is performed, and transmit level information obtained through the detecting to the normalizer;
   a reference receiver configured to receive a reference frequency transmitted from the RF unit, and process the received reference frequency to be used as a reference frequency of the channel unit; and
   a digital-to-analog converter (DAC) configured to convert the digital signal to an analog signal.

7. The amplification system of claim 1, wherein the amplification unit comprises:

an amplification DAC having one or a plurality of analog output pins and configured to output, as a voltage, a control value set by the controller for each frequency and temperature;
an amplification transistor (TR) configured to perform an amplification function, and provided as one or a plurality of amplification TRs of which an operating point is set based on a voltage input from the amplification DAC;
an output detector configured to detect an output level of the amplification unit and transmit the detected output level to the controller;
an amplification temperature detector configured to detect a temperature of the amplification unit and transmit the detected temperature to the controller; and
a reflection detector configured to detect a reflection level of an output side of the amplification unit and transmit the detected reflection level to the controller.

8. The amplification system of claim 1, wherein the controller comprises a temperature detector therein, and has a function of controlling a gain of a front portion of the RF unit using information of a pre-output detector of the RF unit and setting a gain of a rear portion of the RF unit to be opposite to the gain of the front portion to control an overall gain of the RF unit such that the overall gain stays constant without a change.

9. The amplification system of claim 1, wherein the power supply is configured to transmit, to the controller, information on whether power is being normally supplied.

10. The amplification system of claim 1, wherein the dry contact interface is connected to the controller, and configured to externally transmit the state information of the controller through a relay contact.

* * * * *